2,910,509

BIS(HALOALKENYL) SULFIDES

Howard Johnston, Concord, Calif., assignor to The Dow Chemical Company, Midland, Mich., a corporation of Delaware No Drawing. Application August 4, 1958
Serial No. 753,103

4 Claims. (Cl. 260—609)

The present invention is directed to Bis(haloalkenyl) sulfides corresponding to the formula

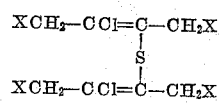

wherein X represents bromine or chlorine. These novel compounds are crystalline solids which are somewhat soluble in many organic solvents such as hexane, benzene and carbon tetrachloride and of very low solubility in water. They have been found to be useful as parasiticides and are adapted to be employed as active toxic constituents of compositions for the control of many bacterial, fungal and insect organisms such as mites, nematodes and *Rhizoctonia solani*.

The new compounds may be prepared by mixing and blending sulfur dichloride with 1,4-dichloro-2-butyne or 1,4-dibromo-2-butyne. The mixing and then blending may be carried out in an inert organic liquid such as methylene dichloride as reaction medium. The amounts of the reactants to be employed are not critical, some of the desired product being obtained when any proportion of ingredients is employed. Good results are obtained when one molecular proportion of sulfur dichloride is reacted with two molecular proportions of the 1,4-dihalo-2-butyne. The reaction is somewhat exothermic and takes place smoothly at temperatures of from 10° to 50° C. The temperature may be controlled by regulating the rate at which the reactants are combined and by external cooling.

In carrying out the reaction, the sulfur dichloride is added slowly portionwise to the 1,4-dihalo-2-butyne and reaction medium, if employed. The addition is carried out with stirring and cooling and at a temperature of from 10° to 50° C. Upon completion of the addition, the reaction mixture may be concentrated by distillation under reduced pressure at temperatures up to about 50° C. to obtain the desired product as a residue. The product may be further purified by conventional methods.

The following examples illustrate the invention but are not to be construed as limiting.

EXAMPLE 1

Bis[3-bromo-2-chloro-1-(bromomethyl)-propenyl]sulfide

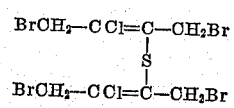

Sulfur dichloride (25 grams; 0.24 mole) was added portionwise with stirring and cooling to 85 grams (0.4 mole) of 1,4-dibromo-2-butyne dispersed in 20 milliliters of methylene chloride. The addition was carried out over a period of 10 minutes and at a temperature of about 30° C. The reaction mixture was thereafter set aside for 16 hours at room temperature and thereafter concentrated by distillation for 30 minutes at a temperature of 35° C. at 3 millimeters pressure. As a result of these operations there was obtained a bis[3-bromo-2-chloro-1-(bromomethyl)-propenyl]sulfide product as a white crystalline residue. This product melted at 95°–96° C. and had bromine, chlorine and sulfur contents of 60.4 percent, 13.5 percent and 6.08 percent, as compared to theoretical contents of 60.6, 13.5 and 6.08 percent, respectively. The infrared spectrum of the product corresponded to the indicated structure.

EXAMPLE 2

Bis[2,3-dichloro-1-(chloromethyl)-propenyl]sulfide

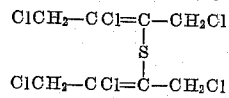

One mole of sulfur dichloride was added portionwise with stirring and cooling to two moles of 1,4-dichloro-2-butyne. The addition was carried out over a period of 30 minutes and at a temperature of about 30° C. The reaction mixture was then set aside at room temperature for 3 hours and thereafter distilled for 30 minutes at 40° C. and under a pressure of 1 millimeter. As a result of these operations, there was obtained a bis[2,3-dichloro-1-(chloromethyl)-propenyl] sulfide product as a crystalline residue. This product was found to melt at 72°–73° C. and to have an infrared spectrum corresponding to the indicated structure.

The new compounds have been tested and found to be useful as parasiticides. For such use, the products may be dispersed on an inert, finely divided solid and employed as dusts. Also, such mixtures may be dispersed in water with the aid of a wetting agent and the resulting aqueous suspensions employed as sprays. In other procedures, the products may be employed as constituents in oil-in-water emulsions or water dispersions with or without the addition of wetting, dispersing and emulsifying agents. In representative operations, aqueous compositions containing 500 parts per million by weight of bis[3-bromo-2-chloro-1-(bromomethyl)-propenyl] sulfide gave 100 percent kills of two spotted spider mites infecting stands of mature bean plants without appreciable injury to the foliage of the plants.

I claim:

1. A bis(haloalkenyl) sulfide corresponding to the formula

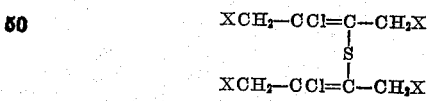

wherein X represents a member of the group consisting of bromine and chlorine.

2. Bis[3 - bromo - 2 - chloro - 1 - (bromomethyl) - propenyl] sulfide.

3. Bis[2,3 - dichloro - 1 - (chloromethyl) - propenyl] sulfide.

4. A method for the production of a bis(haloalkenyl)-sulfide corresponding to the formula

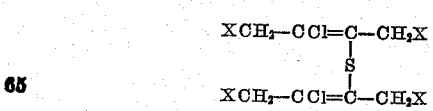

wherein X represents a member of the group consisting of bromine and chlorine which comprises reacting sulfur dichloride with a member of the group consisting of 1,4-dibromo-2-butyne and 1,4-dichloro-2-butyne.

No references cited.